United States Patent
Oohira

(10) Patent No.: US 9,489,095 B2
(45) Date of Patent: Nov. 8, 2016

(54) LIQUID CRYSTAL DISPLAY DEVICE

(71) Applicants: Japan Display Inc., Tokyo (JP); Panasonic Liquid Crystal Display Co., Ltd., Hyogo-ken (JP)

(72) Inventor: Eiji Oohira, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 14/471,680

(22) Filed: Aug. 28, 2014

(65) Prior Publication Data

US 2014/0368468 A1    Dec. 18, 2014

Related U.S. Application Data

(63) Continuation of application No. 13/267,269, filed on Oct. 6, 2011, now Pat. No. 8,830,417.

(30) Foreign Application Priority Data

Oct. 13, 2010  (JP) ................................ 2010-230803

(51) Int. Cl.
   *G02F 1/1333*   (2006.01)
   *G06F 3/044*    (2006.01)

(52) U.S. Cl.
   CPC .......... *G06F 3/044* (2013.01); *G02F 1/133308* (2013.01); *G02F 1/13338* (2013.01); *G02F 2001/133314* (2013.01); *G02F 2001/133317* (2013.01); *G02F 2201/50* (2013.01); *G06F 2203/04104* (2013.01)

(58) Field of Classification Search
   CPC ............... G02F 1/13338; G02F 1/133308; G02F 2001/133314; G02F 2001/133317
   See application file for complete search history.

(56) References Cited

U.S. PATENT DOCUMENTS

| | | | |
|---|---|---|---|
| 2005/0052436 A1 | 3/2005 | Nishiyama et al. | |
| 2007/0097286 A1* | 5/2007 | Oohira | G02B 6/0088 349/58 |
| 2007/0222917 A1 | 9/2007 | Ono | |
| 2009/0086114 A1* | 4/2009 | Higuchi et al. | G02F 1/13338 349/12 |
| 2010/0060601 A1 | 3/2010 | Oohira | |

(Continued)

FOREIGN PATENT DOCUMENTS

| | | |
|---|---|---|
| JP | 2003-043450 | 2/2003 |
| JP | 2009-069334 | 4/2009 |

(Continued)

*Primary Examiner* — Richard Kim
*Assistant Examiner* — Kendrick Hsu
(74) *Attorney, Agent, or Firm* — Hauptman Ham, LLP

(57) ABSTRACT

A display device includes a display panel including a first surface, a second surface opposed to the first surface, and a side surface extending between the first surface and second surface, a frame fixed to the first surface of the display panel by a double-sided tape, and a capacitive touch panel adhered to the second surface of the display panel. The frame includes a first portion opposed to the first surface of the display panel, and a second portion surrounding the side surface of the display panel and opposed to a rear surface of the capacitive touch panel. The capacitive touch panel has a protruding end portion which protrudes beyond one end of the display panel. The protruding end portion overlaps the second portion of the frame, and a gap is delimited between the protruding end portion and the second portion of the frame.

3 Claims, 3 Drawing Sheets

(56) References Cited

U.S. PATENT DOCUMENTS

2010/0110317 A1   5/2010   Chen
2010/0277663 A1   11/2010  Koo

FOREIGN PATENT DOCUMENTS

JP      2010-61026    3/2010
JP      2010-117955   5/2010

* cited by examiner

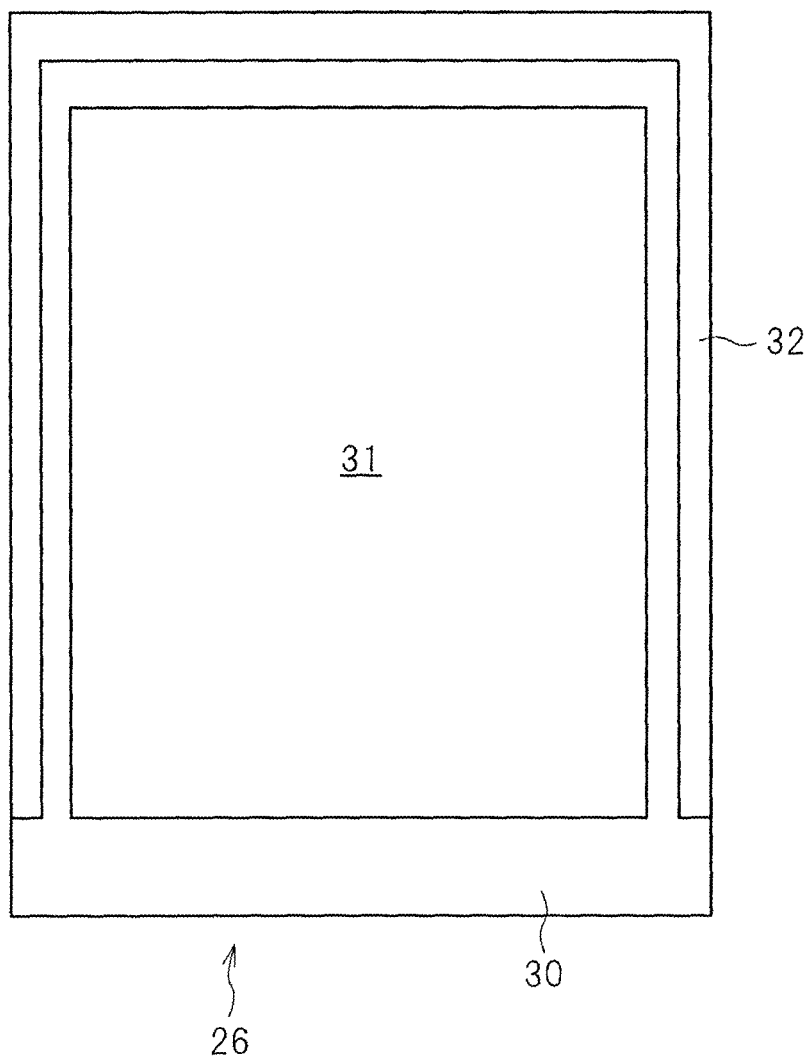

LIQUID CRYSTAL DISPLAY DEVICE

CROSS-REFERENCE TO RELATED APPLICATION

This application is a continuation of U.S. application Ser. No. 13/267,269, filed Oct. 6, 2011, the contents of which are incorporated herein by reference.

The present application claims priority from Japanese application JP 2010-230803 filed on Oct. 13, 2010, the content of which is hereby incorporated by reference into this application.

BACKGROUND OF THE INVENTION

1. Field of the Invention

The present invention relates to a liquid crystal display device.

2. Description of the Related Art

In recent years, there has been increasing demand for reduction in size of a liquid crystal display panel, and hence further studies have been made to narrow a frame edge region in a periphery of a display region. As a result, it has become possible to narrow the frame edge region, with the result that, even in the same display region, the number of panels which can be taken from one mother panel is increased, which provides an effect of contributing to cost reduction. Meanwhile, there has been developed a device in which another panel is overlapped onto the liquid crystal display panel. For example, Japanese Patent Application Laid-open No. 2010-61026 discloses a device in which a touch panel is overlapped onto the liquid crystal display panel.

As described above, although the liquid crystal display panel has been reduced in size, reduction in size of the touch panel has not been progressed. As a result, the touch panel is larger in size than the liquid crystal display panel, and an end portion of the touch panel extends off from the liquid crystal display panel. Further, the touch panel extends off also from a frame holding the liquid crystal display panel. Therefore, the end portion of the touch panel is in a floating state, which leads to easy breakage.

SUMMARY OF THE INVENTION

The present invention has an object to provide a liquid crystal display device in which breakage of an electronic panel adhered to a liquid crystal display panel is prevented.

(1) A liquid crystal display device according to the present invention includes: a liquid crystal display panel including: a panel substrate, which has a front surface and a rear surface on a side opposite to the front surface; and polarizing plates, which are arranged so as to sandwich the panel substrate; a frame, which is fixed to the rear surface of the panel substrate; a backlight unit, which is arranged inside the frame; and an electronic panel, which is overlapped onto the panel substrate on the front surface side of the panel substrate, in which the electronic panel includes a protruding end portion, which extends off from the panel substrate, in which the frame includes: a first portion, which is opposed to the rear surface of the panel substrate; and a second portion, which is provided upright from the first portion on a lateral side of the panel substrate in a direction of the protruding end portion of the electronic panel, and in which the protruding end portion of the electronic panel is opposed to the second portion in a non-adherent state. According to the present invention, although the electronic panel is protruded from the panel substrate, the protruding end portion of the electronic panel is supported by the second portion of the frame. In this manner, it is possible to prevent breakage of the electronic panel adhered to the panel substrate.

(2) In the liquid crystal display device according to the above-mentioned item (1), the second portion may have a surface, which is opposed to the protruding end portion of the electronic panel, the surface being closer to the protruding end portion of the electronic panel relative to the rear surface of the panel substrate.

(3) In the liquid crystal display device according to the above-mentioned item (1), a gap between the second portion and the protruding end portion of the electronic panel may be 0.15 mm or smaller.

(4) In the liquid crystal display device according to any one of the above-mentioned items (1) to (3), the electronic panel may include an outer periphery end portion including, in addition to the protruding end portion, which extends off from the panel substrate, an opposing end portion, which is opposed to the panel substrate, the electronic panel may have a rectangular and planar shape, three sides of the rectangular and planar shape may correspond to a leading end of the protruding end portion, and a remaining side of the rectangular and planar shape may correspond to a leading end of the opposing end portion.

(5) The liquid crystal display device according to the above-mentioned item (4) may further include a spacer, which is interposed between the opposing end portion of the electronic panel and the panel substrate.

(6) In the liquid crystal display device according to the above-mentioned item (5), corresponding one of the polarizing plates may be adhered to the front surface of the panel substrate in a manner avoiding an end portion of the front surface, the electronic panel may be adhered to the corresponding one of the polarizing plates, and the spacer may be positioned at the end portion of the front surface.

(7) In the liquid crystal display device according to the above-mentioned item (6), the panel substrate may include a first substrate and a second substrate, the corresponding one of the polarizing plates may be adhered to the first substrate, the second substrate may be protruded from the first substrate, and the liquid crystal display device may further include an integrated circuit chip and a flexible printed wiring board, which are mounted on a portion of the second substrate protruded from the first substrate.

(8) In the liquid crystal display device according to the above-mentioned item (7), the spacer may be mounted on the first substrate in a manner avoiding the second substrate.

(9) In the liquid crystal display device according to any one of the above-mentioned items (1) to (8), the electronic panel may be one of a touch panel and a parallax barrier panel for achieving auto-stereoscopic display.

BRIEF DESCRIPTION OF THE DRAWINGS

In the accompanying drawings:

FIG. 4 is a plan view of a frame according to the embodiment of the present invention.

DETAILED DESCRIPTION OF THE INVENTION

Hereinafter, an embodiment of the present invention is described with reference to the drawings.

Figure 1:
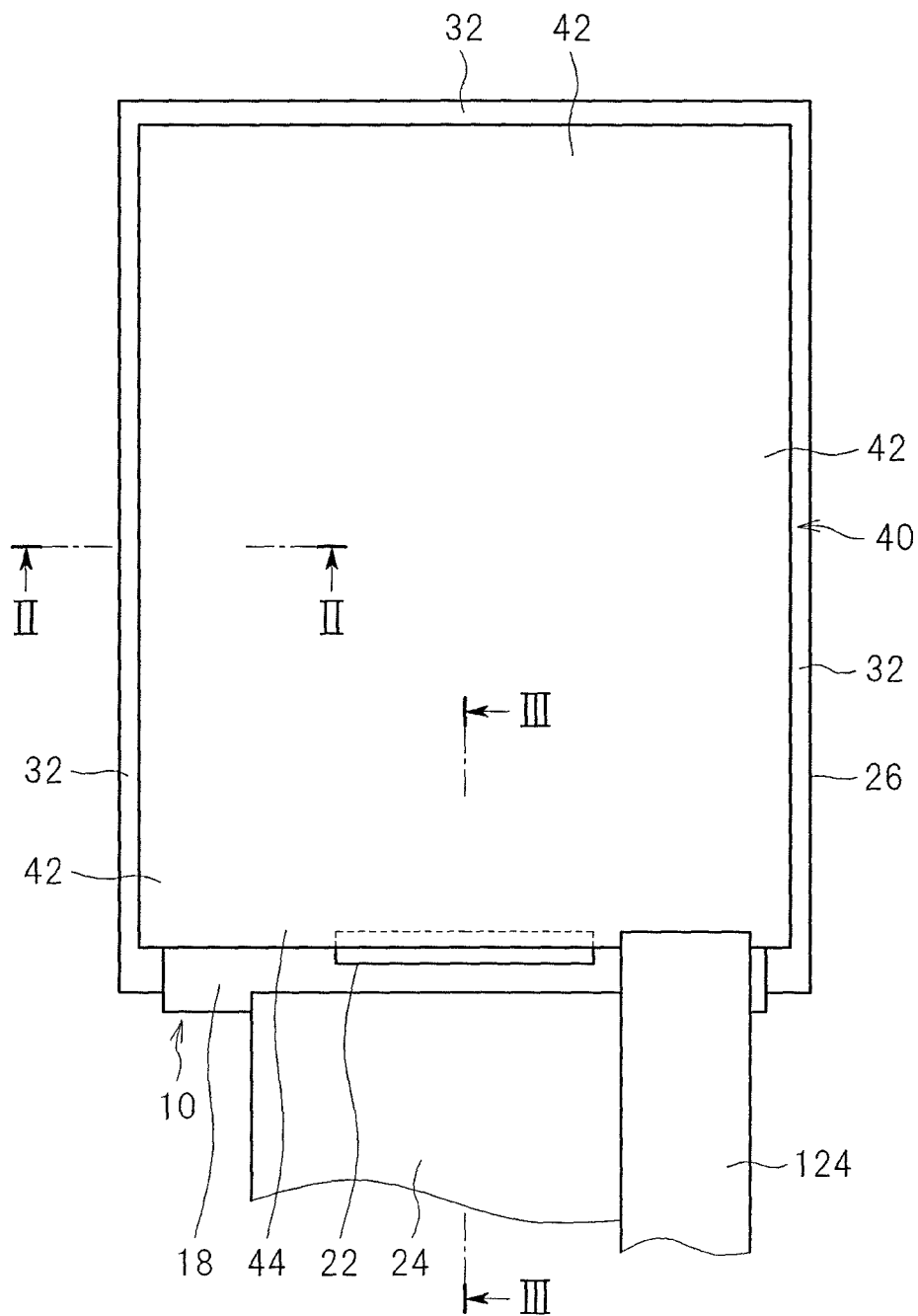
FIG. 1 is a plan view illustrating a liquid crystal display device according to an embodiment of the present invention.
Figure 2:
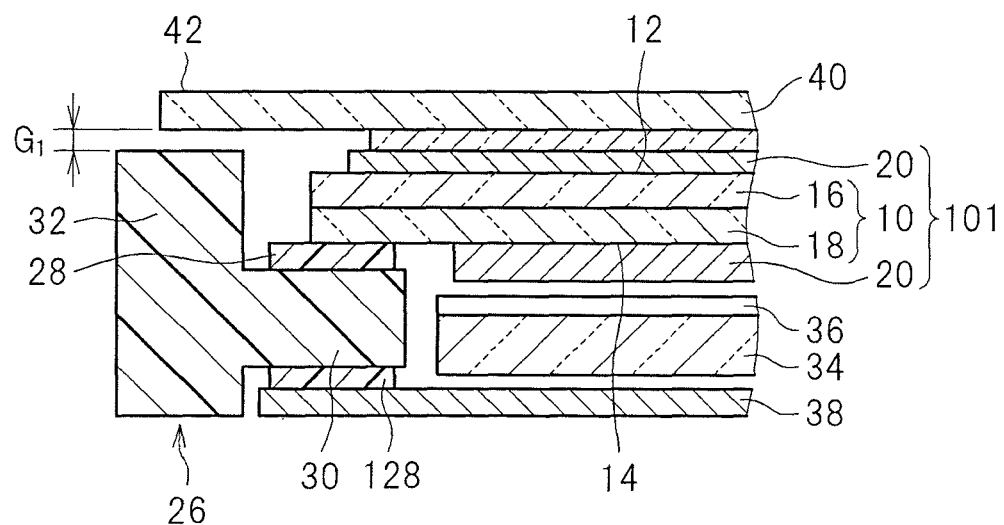
FIG. 2 is a sectional view taken along the line II-II of the liquid crystal display device illustrated in FIG. 1.
Figure 3:
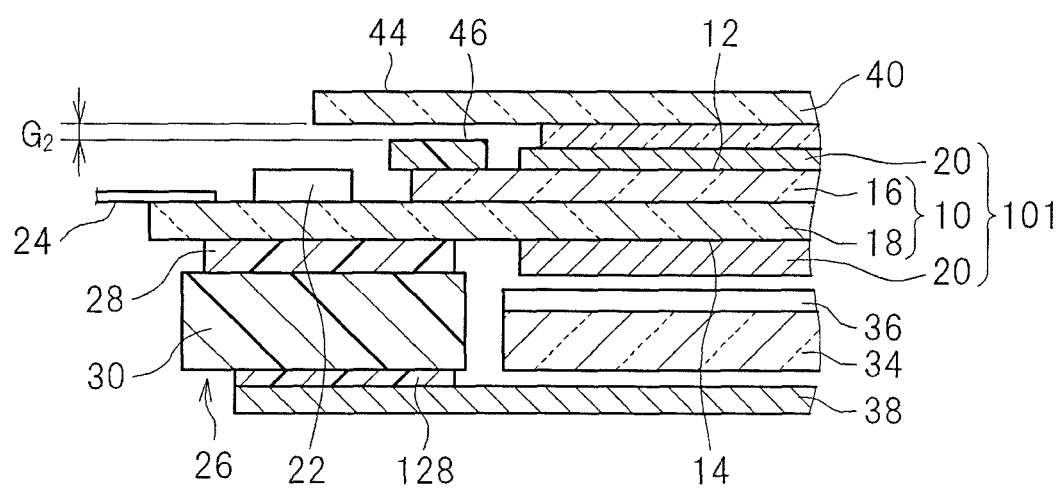
FIG. 3 is a sectional view taken along the line III-III of the liquid crystal display device illustrated in FIG. 1.

FIG. 1 is a plan view illustrating a liquid crystal display device according to the embodiment of the present invention. FIG. 2 is a sectional view taken along the line II-II of the liquid crystal display device illustrated in FIG. 1. FIG. 3 is a sectional view taken along the line III-III of the liquid crystal display device illustrated in FIG. 1. FIG. 4 is a plan view of a frame of the liquid crystal display device according to the embodiment of the present invention, when viewed from a liquid crystal panel side.

The liquid crystal display device includes a liquid crystal display panel 101. A panel substrate 10 has a panel substrate front surface 12 and a panel substrate rear surface 14 on a side opposite to the panel substrate front surface 12. The liquid crystal display panel 101 includes a first substrate 16 and a second substrate 18 (both are, for example, glass substrates), and liquid crystal (not shown) is interposed therebetween. An outer surface (surface on a side opposite to the second substrate 18) of the first substrate 16 corresponds to the panel substrate front surface 12, and an outer surface (surface on a side opposite to the first substrate 16) of the second substrate 18 corresponds to the panel substrate rear surface 14. Onto each of the front surface 12 and the rear surface 14 of the panel substrate 10, a polarizing plate 20 is adhered. The liquid crystal display panel 101 is formed of the panel substrate 10 and the polarizing plates 20 arranged so as to sandwich the panel substrate 10. For example, onto the first substrate 16 (front surface 12), the polarizing plate 20 is adhered in a manner avoiding an end portion of the front surface 12.

The first substrate 16 is a color filter substrate, and the second substrate 18 is a thin film transistor (TFT) substrate (or array substrate) including thin film transistors, pixel electrodes, wiring, and the like. A driving method of the liquid crystal display panel 101 may be any one of an in-plane switching (IPS) method, a twisted nematic (TN) method, a vertical alignment (VA) method, and the like, and electrodes and wiring corresponding to the selected method are formed.

As illustrated in FIG. 3, the second substrate 18 is protruded from the first substrate 16. For example, the first substrate 16 and the second substrate 18 are each formed into a rectangular and planar shape, and an end portion of the second substrate 18 is protruded from one side of the first substrate 16. Onto the portion of the second substrate 18 protruded from the first substrate 16, an integrated circuit chip 22 (for example, semiconductor chip) is mounted, and further, a flexible printed wiring board 24 is fixed. The flexible printed wiring board 24 is fixed at a position closer to the leading end of the second substrate 18 relative to the integrated circuit chip 22. The integrated circuit chip 22 has a driver circuit (not shown) for driving the liquid crystal built therein. The flexible printed wiring board 24 is electrically connected to the liquid crystal display panel 101 and the integrated circuit chip 22.

FIG. 4 is a plan view of a frame 26, when viewed from the panel substrate 10 side. Onto the rear surface 14 of the panel substrate 10, the frame 26 made of, for example, a resin or a metal is fixed. The panel substrate 10 and the frame 26 are fixed to each other with a double-sided tape 28. A first portion 30 of the frame 26 is opposed to the rear surface 14 of the panel substrate 10. Specifically, the first portion 30 is formed into a frame shape, and is opposed to an end portion of the liquid crystal display panel 101. Therefore, the rear surface 14 of the panel substrate 10 faces a space surrounded by the frame of the first portion 30. Inside the rectangular frame 26, a rectangular space 31 is formed. In the space 31, a backlight unit described later is housed. The first portion 30 of the frame 26 is arranged adjacent to the space 31 in a manner surrounding the entire circumference of the space 31. Further, outside the first portion 30, a second portion 32 is arranged along three sides of the frame 26. Onto a portion of the second substrate 18 opposed to a side of the frame 26 on which the second portion 32 is not formed, the above-mentioned integrated circuit chip 22 and flexible printed wiring board 24 are fixed.

As illustrated in FIG. 2, the second portion 32 of the frame 26 is formed upright from the first portion 30 on the lateral side of the panel substrate 10. Further, the second portion 32 is arranged on the lateral side of the panel substrate 10. Specifically, an upper surface (surface facing in the same direction as the front surface 12) of the second portion 32 is higher than the rear surface 14 of the panel substrate 10, and further, may be higher than the front surface 12 of the panel substrate 10.

Inside the frame 26, the backlight unit including a light guide plate 34 is arranged. The light guide plate 34 is a member for converting light of a light emitting diode (not shown) as a point light source into a planar light source to illuminate the liquid crystal display panel 101.

An optical sheet group 36 is arranged between the liquid crystal display panel 101 and the light guide plate 34. The optical sheet group 36 includes a diffusion sheet, a prism sheet, and the like. Further, below the light guide plate 34 (on a side opposite to the optical sheet group 36), a reflection sheet 38 is arranged. The reflection sheet 38 is fixed to the frame 26 (specifically, the first portion 30) with a double-sided tape 128.

An electronic panel 40 is overlapped on the panel substrate 10 on the front surface 12 side of the panel substrate 10. The electronic panel 40 may be a capacitive touch panel or touch panels of other types, or a parallax barrier panel (for example, parallax barrier 3D liquid crystal panel) for achieving auto-stereoscopic display.

The electronic panel 40 is adhered to the liquid crystal display panel 101 with an adhesive or a pressure-sensitive adhesive (not shown) having flexibility. When the polarizing plate 20 is adhered to the panel substrate 10, the electronic panel 40 is adhered to the polarizing plate 20. In other words, the electronic panel 40 is adhered to the panel substrate 10 through intermediation of the polarizing plate 20 with the adhesive or the pressure-sensitive adhesive provided on both sides of the polarizing plate 20.

The electronic panel 40 has a protruding end portion 42, which extends off from the panel substrate 10. For example, the entire outer periphery end portion of the electronic panel 40 may extend off from the panel substrate 10, but in this embodiment, a part of the outer periphery end portion of the electronic panel 40 extends off from the panel substrate 10, and the remaining part thereof does not extend off from the panel substrate 10. Note that, an outer shape of the polarizing plate 20 in a surface direction (X-Y direction) is smaller than an outer shape of the panel substrate 10. Further, the polarizing plate 20 is adhered to the panel substrate 10 so as not to extend off therefrom, and hence the outer shape of the panel substrate 10 in the surface direction is the same as an outer shape of the liquid crystal display panel 101 in the surface direction.

As illustrated in FIG. 2, the second portion 32 is formed upright from the first portion 30 of the frame 26 in a direction approaching the protruding end portion 42 of the electronic panel 40. Further, the protruding end portion 42 of the electronic panel 40 is opposed to the second portion 32 of the frame 26 in a non-adherent state. In this specification, the "non-adherent state" refers to a state in which neither adhesion nor pressure-sensitive adhesion is observed, but contact may be observed. The surface of the second portion 32 opposed to the protruding end portion 42 of the electronic panel 40 is closer to the protruding end portion 42 of the electronic panel 40 relative to the rear surface 14 of the panel substrate 10. A gap $G_1$ between the protruding end portion 42 of the electronic panel 40 and the second portion 32 is preferred to be 0.15 mm or smaller.

The outer periphery end portion of the electronic panel 40 includes, in addition to the protruding end portion 42, which extends off from the panel substrate 10, as illustrated in FIG. 3, an opposing end portion 44 opposed to the liquid crystal display panel 101 (second substrate 18). The electronic panel 40 has a rectangular and planar shape, and three sides of the rectangular shape correspond to a leading end of the protruding end portion 42, and the remaining one side of the rectangular shape corresponds to a leading end of the opposing end portion 44.

Between the opposing end portion 44 of the electronic panel 40 and the panel substrate 10, a spacer 46 is interposed. The spacer 46 is made of a resin (for example, polyethylene terephthalate (PET)). The spacer 46 is mounted on the first substrate 16 (for example, end portion of the first substrate 16) of the panel substrate 10. The spacer 46 is provided in a manner avoiding contact with the second substrate 18, and as illustrated in FIG. 3, may extend off from the first substrate 16 to protrude above the second substrate 18. The spacer 46 is positioned at the end portion of the front surface 12 (accurately, outer surface of the first substrate 16) of the panel substrate 10. The electronic panel 40 (opposing end portion 44) and the spacer 46 are provided in at least the non-adherent state, preferably in a non-contact state, and a gap $G_2$ therebetween is preferred to be 0.1 mm or smaller. Further, the electronic panel 40 (opposing end portion 44) and the integrated circuit chip 22 are provided in at least the non-adherent state, preferably in the non-contact state. Note that, as illustrated in FIG. 1, onto the opposing end portion 44 of the electronic panel 40, a flexible printed wiring board 124 is fixed, which is electrically connected to an inner circuit of the electronic panel 40.

According to this embodiment, the electronic panel 40 is protruded from the panel substrate 10, but the protruding end portion 42 thereof can be supported by the second portion 32 of the frame 26. In this manner, it is possible to prevent breakage of the electronic panel 40 adhered to the panel substrate 10. In this embodiment, the panel substrate 10, which is smaller in size than the electronic panel 40, is used, and hence a large number of panel substrates 10 can be taken from one mother substrate, which allows production at low cost.

The present invention is not limited to the embodiment described above, and various modifications may be made thereto. For example, the structure described in the embodiment may be replaced by substantially the same structure, a structure providing the same action and effect, and a structure which may achieve the same object.

What is claimed is:

1. A display device, comprising:
   a display panel including a first surface, a second surface opposite the first surface, and a first side surface extending between the first surface and the second surface;
   a capacitive touch panel over the display panel, the capacitive touch panel having a rear surface facing the second surface of the display panel;
   a frame including a first portion and a second portion, the first portion of the frame having an upper surface facing the first surface of the display panel, the second portion of the frame having a second side surface facing the first side surface of the display panel, and the second portion of the frame having a top surface facing the rear surface of the capacitive touch panel; and
   a spacer over the display panel,
   wherein
      the capacitive touch panel comprises a protruding end portion extending beyond at least one end of the display panel,
      the protruding end portion of the capacitive touch panel has a first edge that overlaps the second portion of the frame,
      the capacitive touch panel comprises a second edge that overlaps the second surface of the display panel,
      the protruding end portion of the capacitive touch panel and the second portion of the frame are separated by a gap, and
      the spacer is separated from the capacitive touch panel by an air gap.

2. The display device according to claim 1, wherein the second surface of the display panel is on a first level, a third surface of the display panel is on a second level over the first level, the second surface of the display panel is farther from the capacitive touch panel than the third surface of the display panel, and the spacer is over the third surface of the display panel.

3. A display device, comprising:
   a display panel including a first surface, a second surface opposite the first surface, and a first side surface extending between the first surface and the second surface;
   a capacitive touch panel over the display panel, the capacitive touch panel having a rear surface facing the second surface of the display panel; and
   a frame including a first portion and a second portion, the first portion of the frame having an upper surface facing the first surface of the display panel, the second portion of the frame having a second side surface facing the first side surface of the display panel, and the second portion of the frame having a top surface facing the rear surface of the capacitive touch panel,
   wherein
      the capacitive touch panel comprises a protruding end portion extending beyond at least one end of the display panel,
      the protruding end portion of the capacitive touch panel has a first edge that overlaps the second portion of the frame,
      the capacitive touch panel comprises a second edge that overlaps the second surface of the display panel,
      the protruding end portion of the capacitive touch panel and the second portion of the frame are separated by a gap, and
      the gap between the capacitive touch panel and the second portion of the frame is an air gap.

* * * * *